United States Patent [19] [11] 4,220,492
Lenhardt [45] Sep. 2, 1980

[54] CONTINUOUS PRESS WITH AT LEAST TWO ADJUSTABLE PAIRS OF COMPRESSION MEMBERS FOR COMPRESSING MULTIPLE PANELS OF INSULATING GLASS

[75] Inventor: Karl Lenhardt, Neuhausen-Hamberg, Fed. Rep. of Germany

[73] Assignee: Firma Karl Lenhardt

[21] Appl. No.: 830,150

[22] Filed: Sep. 2, 1977

[30] Foreign Application Priority Data

Sep. 7, 1976 [DE] Fed. Rep. of Germany ....... 2640153

[51] Int. Cl.[2] ....................... B32B 31/00; B30B 15/14; B30B 7/00

[52] U.S. Cl. ....................................... 156/358; 100/48; 100/138; 156/580

[58] Field of Search ................. 156/580, 555, 99, 103, 156/107, 358; 100/137, 138, 48, 35, 47, 49, 50

[56] References Cited

U.S. PATENT DOCUMENTS

| | | | |
|---|---|---|---|
| 1,897,862 | 2/1933 | Randall | 100/90 |
| 1,960,580 | 5/1934 | Fraser | 156/103 |
| 3,084,314 | 4/1963 | Ziffer | 100/47 |
| 3,089,408 | 5/1963 | Swindler | 100/49 |
| 3,096,708 | 7/1963 | Moser | 100/50 |
| 4,002,114 | 1/1977 | Guttinger | 100/49 |
| 4,030,961 | 6/1977 | Straeten et al. | 156/555 |

*Primary Examiner*—Douglas J. Drummond
*Attorney, Agent, or Firm*—Otto John Munz

[57] ABSTRACT

A press for pressing assemblies or panels of multiple flat sheets or discs of insulating glass, has at least two pairs of upper and lower press members between which the panels are conveyed, and switches are disposed in the path of the panels to cause timed operation of the press members to sequentially press the leading, side and trailing edges of the panels as they pass between the upper and lower press members. Sensors are arranged in the path of the panels to detect the width of the panels and adjust the pressure exerted by the press members to prevent damage to narrow panels.

11 Claims, 17 Drawing Figures

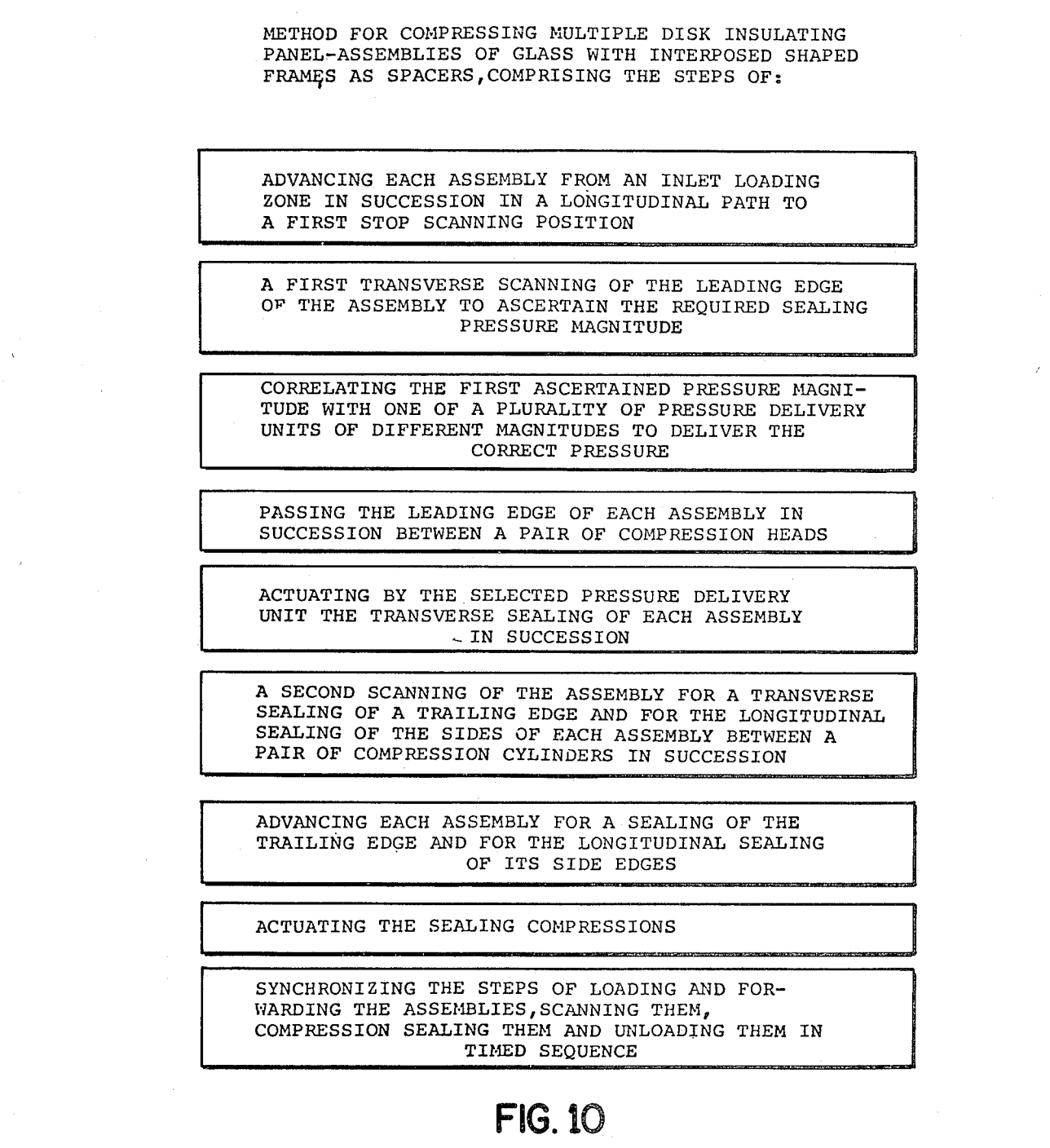

METHOD FOR COMPRESSING MULTIPLE DISK INSULATING PANEL-ASSEMBLIES OF GLASS WITH INTERPOSED SHAPED FRAMES AS SPACERS, COMPRISING THE STEPS OF:

ADVANCING EACH ASSEMBLY FROM AN INLET LOADING ZONE IN SUCCESSION IN A LONGITUDINAL PATH TO A FIRST STOP SCANNING POSITION

A FIRST TRANSVERSE SCANNING OF THE LEADING EDGE OF THE ASSEMBLY TO ASCERTAIN THE REQUIRED SEALING PRESSURE MAGNITUDE

CORRELATING THE FIRST ASCERTAINED PRESSURE MAGNITUDE WITH ONE OF A PLURALITY OF PRESSURE DELIVERY UNITS OF DIFFERENT MAGNITUDES TO DELIVER THE CORRECT PRESSURE

PASSING THE LEADING EDGE OF EACH ASSEMBLY IN SUCCESSION BETWEEN A PAIR OF COMPRESSION HEADS

ACTUATING BY THE SELECTED PRESSURE DELIVERY UNIT THE TRANSVERSE SEALING OF EACH ASSEMBLY IN SUCCESSION

A SECOND SCANNING OF THE ASSEMBLY FOR A TRANSVERSE SEALING OF A TRAILING EDGE AND FOR THE LONGITUDINAL SEALING OF THE SIDES OF EACH ASSEMBLY BETWEEN A PAIR OF COMPRESSION CYLINDERS IN SUCCESSION

ADVANCING EACH ASSEMBLY FOR A SEALING OF THE TRAILING EDGE AND FOR THE LONGITUDINAL SEALING OF ITS SIDE EDGES

ACTUATING THE SEALING COMPRESSIONS

SYNCHRONIZING THE STEPS OF LOADING AND FORWARDING THE ASSEMBLIES, SCANNING THEM, COMPRESSION SEALING THEM AND UNLOADING THEM IN TIMED SEQUENCE

FIG. 10

CONTINUOUS PRESS WITH AT LEAST TWO ADJUSTABLE PAIRS OF COMPRESSION MEMBERS FOR COMPRESSING MULTIPLE PANELS OF INSULATING GLASS

FIELD OF THE INVENTION

The invention relates to a press for continuous pressing of assemblies of multiple sheets or discs of insulating glass to form insulating glass panels, with shaped frames inserted as spacers between the sheets, the frames being provided on both sides with sealing material, the and press being equipped with a plurality of press members comprising a pair of compression heads with an adjustable spacing between them for transverse compression of the leading and trailing edges of the panels and with a pair of cylinders with an adjustable spacing between them for longitudinal compression of the sides or side edges of the assemblies or panels, with means to carry the assemblies from an inlet loading zone through the compression members to an outlet discharge zone

DESCRIPTION OF THE PRIOR ART

The most relevant prior art known to applicant is represented by U.S. Pat. No. 4,030,961, issued June 21, 1977, to Straeten, et al, U.S. Pat. No. 1,960,580, issued May 29, 1934 to Frazer, and U.S. Pat. No. 1,897,862, issued Feb. 14, 1933 to Randall.

In the prior art, in order to achieve an intimate connection between glass disks and a spacer frame in multiple discs insulating glass, and a distribution of sealing material between them over the widest possible area, the discs are placed together and are then pressed by means of two rolls or cylinders rotating in opposite directions. In order to obtain a wedge angle as flat as possible which permits a favorable pressure distribution in the glass and prevents the breaking thereof, it is necessary to employ press rolls with a relatively large diameter. This, however, unfavorably affects the weight and the volume of the machine.

In the pressing of a multiple-disk insulating glass panel, a very high pressure is necessary for a short time during the passing of a transverse edge, in order to obtain the necessary area pressure over the entire width of the disk. In this process there exists the risk of a glass breakage. Besides, it is unavoidable that the relatively great forces acting upon the bearing ends of the press rolls cause a bending of the rolls, so that smaller pressure ratios prevail in the center than on the outside or edges. The result is that the front and rear transverse edges of the disk package do not undergo a uniform pressing. The pressure required for the longitudinal or side edges is much too high for the transverse edges, so that a corresponding reduction of pressure is necessary. This requires a corresponding control expenditure. (German Gebrauchsmuster No. 73/6310 to Karl Lenhardt, dated Oct. 31, 1973).

SUMMARY OF THE INVENTION

The primary object of the invention is to provide a continuous press for multiple-disc panels such as of insulating glass which permits a satisfactory transverse edge as well as longitudinal edge-compression.

Another object of the invention is to provide a beam press in combination with a pair of cylinders and disposed transversely to the direction of conveyance, the beam press arranged to press the leading and trailing edges of a panel, and the cylinders arranged to press the side edges of the panel.

A further object is to provide a press for pressing panels of insulating glass, wherein a beam press for pressing the leading and trailing edges of panels is provided in association with cylinder presses for pressing the side edges of the panels, the beam press being movable in the direction of movement of the panel as well as perpendicularly thereto.

Yet another object is to provide a press for pressing flat panels, wherein the press includes means for sensing the width of a panel to be pressed and for adjusting the pressure of the press to avoid excessive pressure per unit area on the panel.

Another object of the invention is to provide a uniform compression of the transverse edges of the assembled disk packages by separate processing of the transverse and longitudinal edges. This permits a decrease in the diameter of the press cylinders, an increase in the passing speed of the disk packages up to 100% and a strong adaptation to the general transportation speed within the production line, whereby the production rhythm is positively affected. Since the pair of cylinders serves only for compressing the longitudinal edges, it can be entirely adjusted to this function. This leads, in connection with the lower pressing pressure, to substantially lighter cylinders with smaller diameters. This in turn has an advantageous effect upon the weight and the volume of the machine.

BRIEF DESCRIPTION OF THE DRAWINGS

FIG. 10 is a simplified diagrammatic representation of the method steps of the invention.

Figure 1:
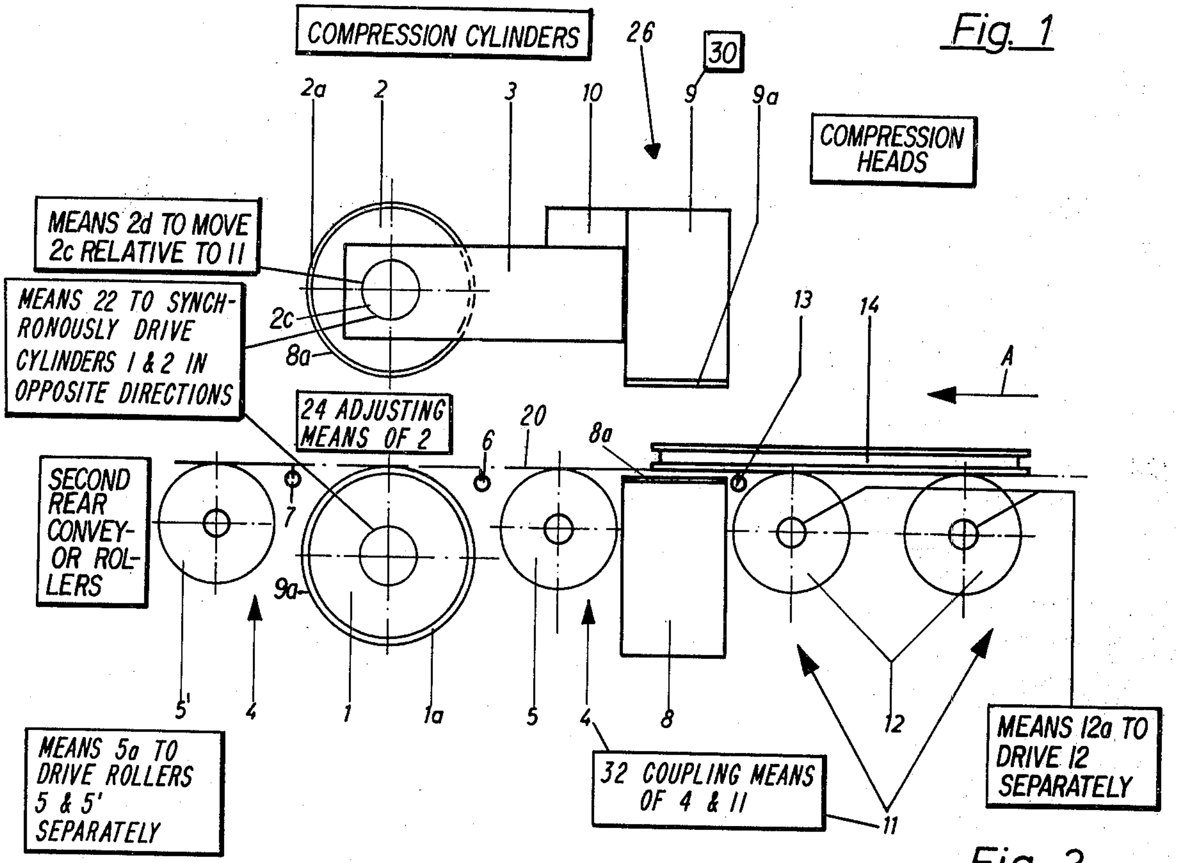
FIGS. 1 to 6 depict in diagrammatic representations a first embodiment of a continuous press according to the invention. The several figures represent various operating phases of a continuous cycle.

Repetitions of descriptions of reference numerals for parts common to the various figures were omitted for purposes of brevity.

DESCRIPTION OF THE PREFERRED EMBODIMENTS

In the drawings, wherein the same reference numerals denote the same or equivalent parts throughout the several views, an upper compression cylinder 1 and a lower compression cylinder 2 are mounted in a housing, not shown, and are for rotation, spaced from each other in parallel relationship, with their shaft-ends 1c and 2c respectively, in vertical alignment.

The cylinders are provided with an elastic coat **1*a* and 2*a* respectively. Means 22 are provided to drive the cylinders synchronously in opposite directions. The lower cylinder, taking into consideration its elastic coat, defines with its upper surface tangent a conveyor plane 20 for a disk or panel assembly or package 14 to be compressed for purposes of gluing its periphery together. While the invention is demonstrated hereinafter for purposes of simplicity of explanation with the conveyance path of the disk assembly depicted and hereinafter described as horizontal, it is also applicable to an apparatus and method employing a conveyance path at an angle from horizontal and preferably also to one having a vertical path. As shown on FIG. 9, the lower cylinder is located stationary relative to the ground and the path of conveyance of the disk package. It is mounted relative to a rear conveyor track 4, which is equipped with rear conveyor rollers 5 and 5', arranged on either side of the lower cylinder 1, spaced therefrom and lying with their upper horizontal tangent in the conveyance path 20. Means 5***a* are provided to drive the rollers 5 and 5' separately. A roller front switch 6 and a roller rear switch 7 are located in the direction of the path of conveyance between the lower cylinder and the rollers 5 and 5', respectively. Upper cylinder adjusting means 24 are connected to the shaft ends thereof for its vertical adjustment relative to the lower cylinder. Conventional pneumatic or equivalent means are suitable therefor.

A crossbeam 3 mounted to the upper cylinder projects into the path of motion of a portion of a beam press 26. The beam press has an upper head 9 and a lower head 9. The heads are arranged in vertical alignment in front of the pair of the cylinders 1 and 2 in the direction of the passage or conveyance of a glass package or assembly 14, shown by arrow "A". The beampress extends transversely to the direction of the passage and over the operational width of the machine. The operating surfaces of the two press heads are provided with elastic coats, 8*a* and 9*a*, respectively, such as a rubber coat. The lower press head is provided with means to reciprocate it into a position of rest below the level of the plane of conveyance as shown on FIG. 1 and to raise it into a position of alignment, shown on FIG. 2, for the purpose of the pressing operation, so that its rubber coat protrudes above the level of the conveying plane 20.

The upper press head is vertically adjustable by means 30 such as pneumatic means. A cam 10 is fixed on the upper press head, or equivalent means such as electric, hydraulic or pneumatic movers are provided, to establish via crossbeam 3 an operative connection to the upper press roll 2.

A front conveyor track 11 is mounted in the direction of conveyance in front of the lower press head. This track is provided with driving track rollers 12 with means 12*a* to drive them separately. In order to convey the multiple-panel insulating glass package assembly through the press, coupling means 32 are provided to couple the conveyor tracks 4 and 11 to make them operable as a driving mechanism.

A front track switch 13 is provided between the lower press head and the front conveyor track at the level of the conveyor plane.

The operating sequence of a work cycle of the continuous press is now explained, first with reference to FIGS. 1 to 8. As an assembled disk package is transported over the conveyor track 11, it triggers the front track switch 13. Thereby the drive of the conveyor track 11 is shut off (as more fully explained hereinafter) and the disk package 14 comes to a rest in the area of the beam heads in the position shown on FIG. 1.

Figure 2:
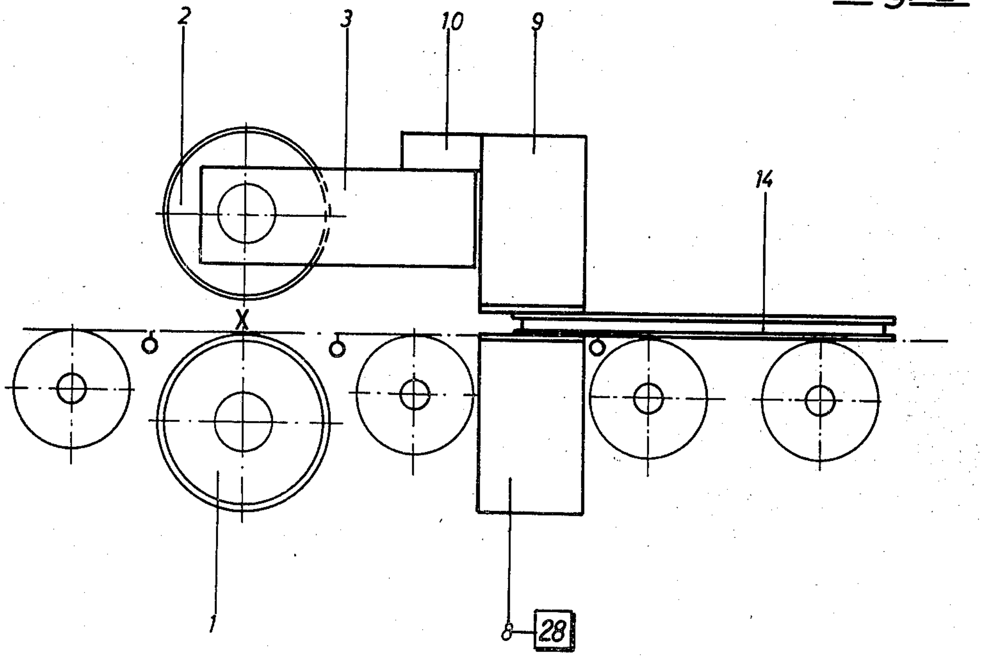

The pneumatic mechanism 30 of the beam heads 8 and 9 is acted upon through switch 13 with a predetermined delay, and the lower press head is lifted to the position shown in FIG. 2. The upper press head is lowered, and in this operation it carries the upper cylinder downward via engagement between the cam 10 and the cross beam 3. This press cylinder reaches in this stage a preliminary terminal position in which the spacing "S" between the surfaces of the two cylinders is by a few millimeters larger than the thickness of the disk package which in the meantime has been pressed in the frontal edge area by the beam press as shown on FIG. 2.

Figure 8:
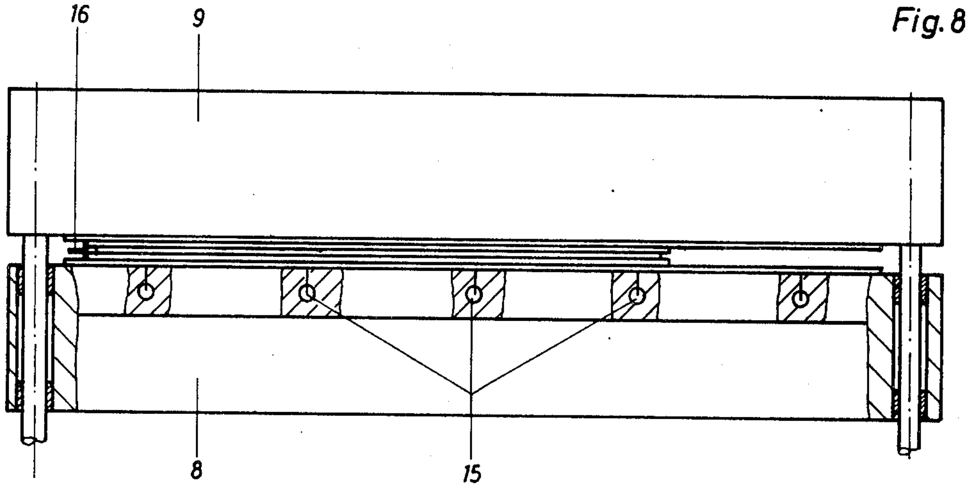
FIG. 8 depicts in diagrammatic representation, partly in section, a front view of a beam press according to the invention.

In order to achieve a uniformly good compression, even at large widths of the disk package, and to avoid at small disk dimensions development of excessive surface pressures which possibly could result in the breaking of the disk package, particularly when it includes glass panels, a plurality of scanners 15 spaced under the operating conveyance level over the operating width of the apparatus are provided in the entrance area of the operating surface area of the lower press head as shown on FIG. 8.

The scanners include any conventional means of detecting or identifying dimensions, spacings or distances, such as electric switches, cam or magnetically operated switches, photo-cells and equivalents.

Each of the scanners controls one pressure valve which in its turn controls the beam press. The valves are combined with pressure reducers 34 (FIG. 11) so adjusted that starting from a disk with one edge located at 16, shown on FIG. 8, the outgoing pressures of the valves are of different intensities, increasing in succession as the width of the panel or discs increases from edge 16. Commercially available pressure reducers of conventional construction suitable for the purpose are made for instance by the Norgren GmbH, Dusseldorf, West Germany. Corresponding to the prevailing width of a disk package, one or more of the scanners 15 are switched on and thereby their associated valves are actuated. Thus, these valves permit automatically, corresponding to their respective pressure gradations, to reach the beam press via pneumatic or hydraulic cylinders with an approximate compression that is specific for the given width of the disk package. Valves of conventional designs suitable for the purpose are commercially available from WABCO Westinghouse Corporation.

The automatic adjustment of the compressing pressure to the width of the disk package assures a steady, uniform desired compression. Thus, immediately before each compression of the transverse leading or trailing edge, the edge length is determined by the scanners 15, and the corresponding pressure is set. This is also advantageous when a disk package has a geometric shape deviating from a rectangle, such as when the lengths of the front and of the rear transverse edges are different.

The sequence of the scanners spaced from each other thus performs simultaneously a scanning function as well as a valve control function.

The scanning principle is particularly important when irregular or assymetric package disk shapes are involved which extend, for example, toward one end with a pointed or trapezoidal shape. Because of the laterally arranged scanners, the beam press in such instances is cut out of operation when a specific minimum width is reached. With a very short transverse edge or if such edge is non-existent, the necessary compression is taken care of during the passage of the package between the pair of cylinders.

Figure 3:
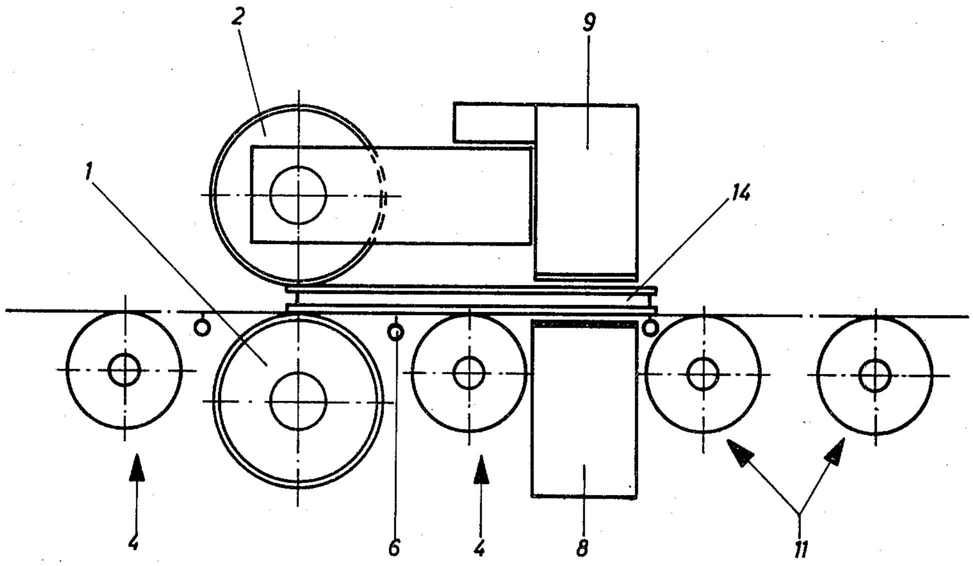

If the width of the package is sufficient to be pessed, after the compression of the leading transverse edge of the disk package according to FIG. 2, the beam press releases it by the return of the lower press head to the position of rest and by the lifting of the upper press head by a few millimeters, as shown on FIG. 3.

The upper cylinder remains in the position once assumed. With the opening of the beam press, the rolls of the conveyor tracks 4 and 11 are driven synchronously, so that the disk package is fed to the pair of cylinders. In the course of this advance, the disk package actuates the first rear switch 6 which results in a further lowering of the upper press cylinder. The sequences are chosen in such a way that the upper cylinder comes to rest upon the edge area previously compressed by the beam press. Immediately following this operation, the compressing pressure pre-set at the pressure reducer 34 is built up, and the longitudinal edges of the disk package are compressed while the disc package is passing between the cylinders.

Figure 9:
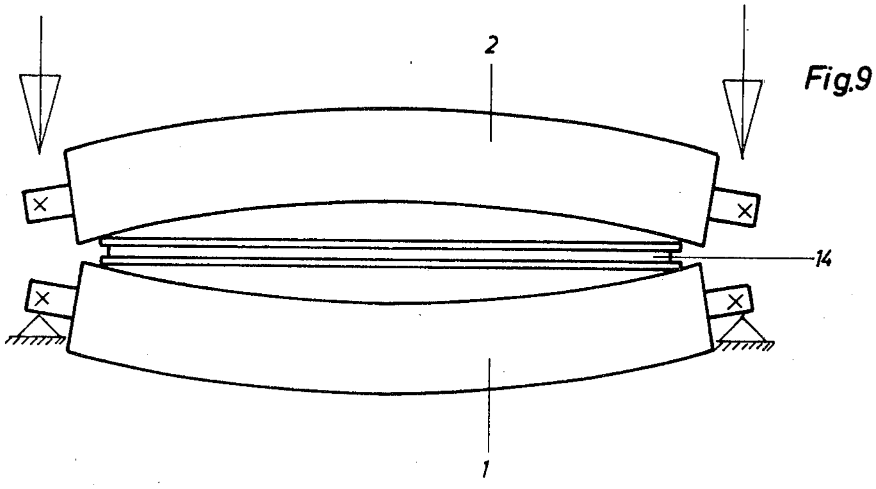
FIG. 9 depicts in diagrammatic representation a pair of cylinders during a pressing operation.

As shown on FIG. 9 in an exaggerated manner, the press cylinders extending over the whole operating width of the disk package are bent and compress the disk package 14 in such a manner that they bulge outwardly in their centers. Since in the present embodiment, the press rolls have only the function of compressing the longitudinal edges of the disk package, the outward bulging does not have a negative effect. The tilting of the cylinders produced thereby relative to the disk package is so slight that it is compensated by the elastic coats of the rolls.

Further, because the function of the cylinders in this instance is limited only to the pressing of the longitudinal edges of the disk packages, it is within the scope of this invention to replace the cylinders by pairs of rollers adapted to the edge pressing width, with one of the pairs adjustable axially to the prevailing disk package width. This requires an additional manual or automatic adjusting device. This arrangement, however, is not applicable to disk packages which, due to a deviation from the rectangular shape, do not have the longitudinal edges in parallel. With the use of cylinders which extend over the entire operating width of the apparatus, these problems do not occur.

Figure 4:
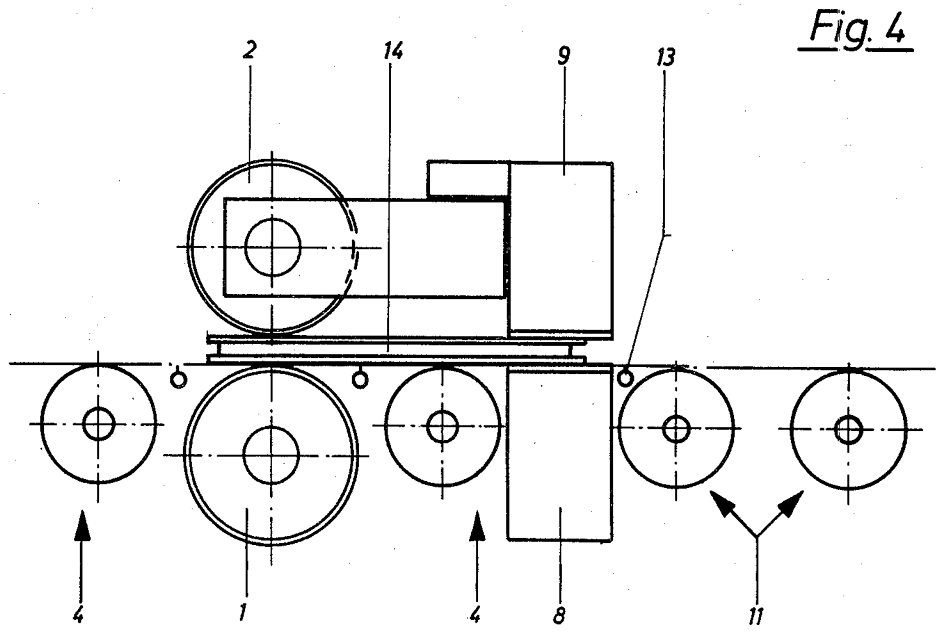
Figure 5:
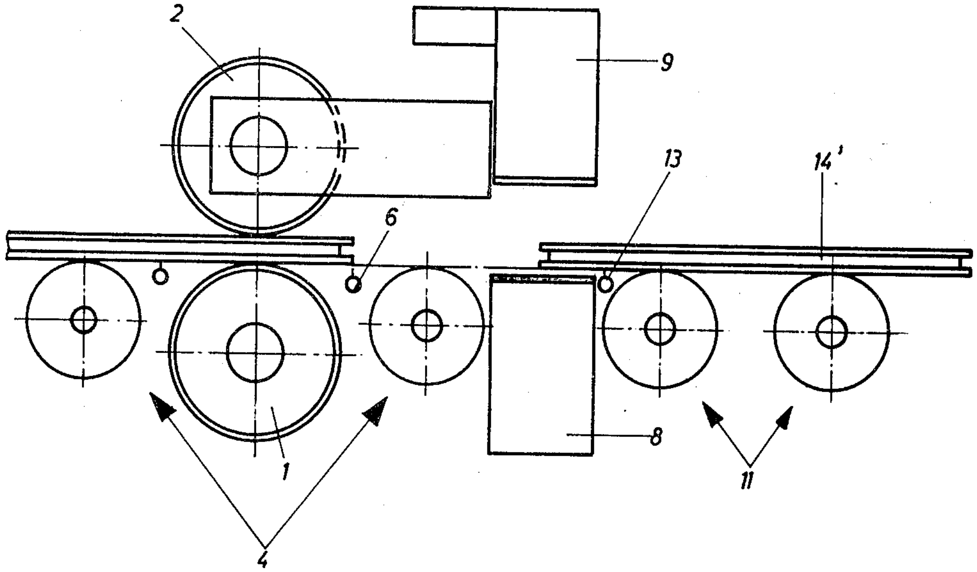
Figure 6:
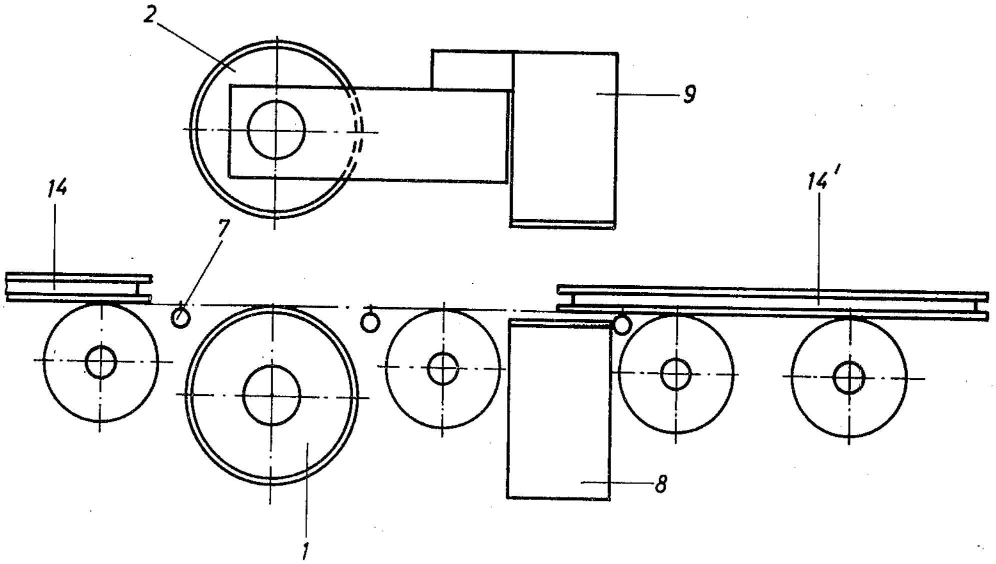
Figure 7A:
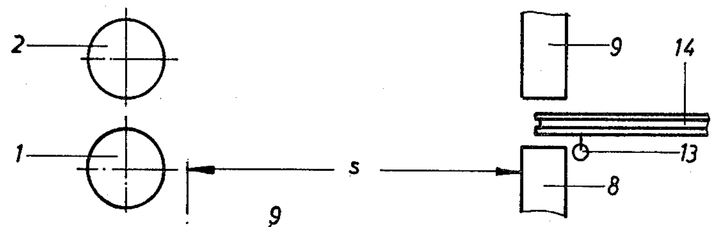
FIGS. 7*a* to 7*f* depict in diagrammatic representations an improvement of the continuous press according to FIG. 1, with a beam press displaceable relative to a pair of compressing cylinders.
Figure 7B:
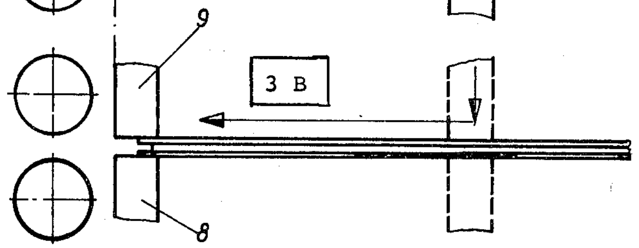
Figure 7C:
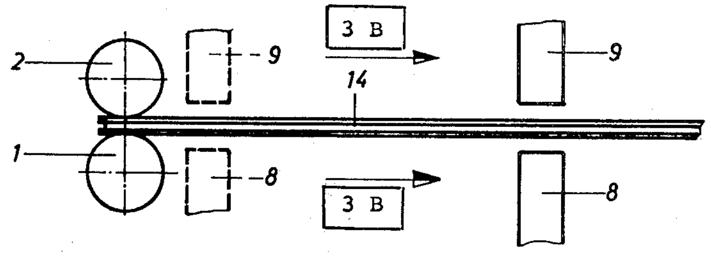
Figure 7D:
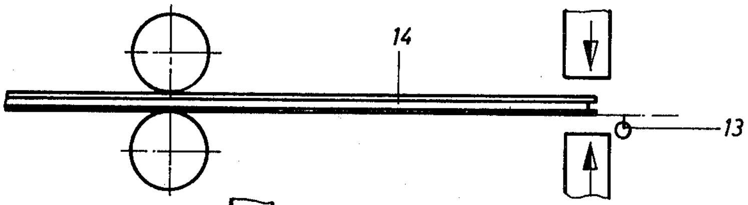
Figure 7E:
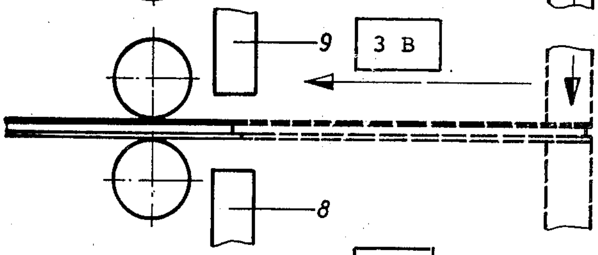
Figure 7F:
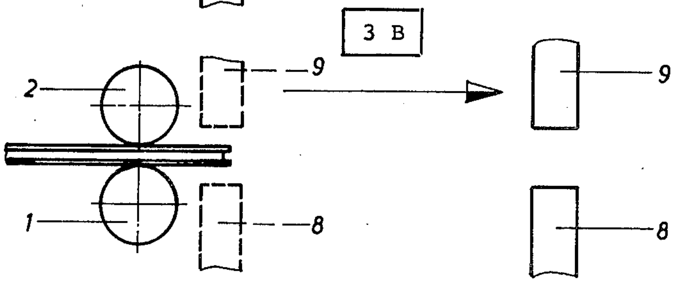

The compression of the longitudinal edges of the disk package in their passage takes place without interruption until the trailing transverse edge of the disk package has released switch 13 as shown on FIG. 4. The switching operation connected therewith stops the drive of the conveyor tracks and of the pair of cylinders, which remain in a compressing position. Thus, the disk package comes to rest in the position shown on FIG. 4, with its trailing transverse edge positioned underneath the beam press. The beam press carries out the compression of the trailing transverse edge of the disk package in the manner described above in connection with compression of the leading edge. With the subsequent opening of the beam heads, the drive of the conveyor track and of the cylinders is switched on again automatically and the disk package is moved on and through between the cylinders. In the meantime, both press heads automatically return to the initial position, as shown on FIG. 5. The release of the first rear roller switch 6 prepares the lifting of the upper cylinder and its return to the initial position. It starts when the rear transverse edge of the disk package passes the cylinders. With the release of the switch 6, the drive of the conveyor track 11 is also switched on again. A next following disk package 14′ is therefore fed to the press. With the actuation of the track switch 13 the drive of the conveyor track is switched off again in such a way that the following disk package 14′ comes to rest in the position shown on FIG. 5 in the area of the beam head. Actuation of the beam heads as already described, however, is released only when the second rear roller switch is no longer actuated. According to FIG. 6, this occurs only after the disk package has safely passed the area of the cylinders and has released switch 7. Therewith a new operating cycle starts immediately, initiated by the following disk package 14′ which already has previously been conveyed into the area of the beam heads, since the track switch 13 has already been actuated.

With the aid of FIGS. 1 to 6, the course of a work cycle of the continuous press explained above is described in the following in greater detail with particular reference to FIGS. 11 and 12.

With the feeding of a disc package 14 via transportation track 11, switch 13 is actuated, the latter switches via its contacts sets 13/1 and 13/2 the drive of the transportation belt 11, by switching clutch 25 to break 26 (FIG. 12), off in such a manner that disc package 14 comes to a standstill in the position shown in FIG. 1, in the area of beam press 8, 9. With a correspinding time delay, the pnumatic mechanism of beam press 8, 9 is actuated via switch 13 in that via a contact set 13/3, a magnetically actuated pilot 44 is energized and thus actuated. According to FIG. 11, pressure is thus exerted upon the right chamber of the pressure cylinder 42 and is conveyed therefrom to the bottom press beam 8, so that the latter is moved up to its upper terminal position. At the same time, contact set 13/4 is closed and contact set 13/5 is opened, thereby via a magnetically actuated servo valve 481 a two way pilot valve 48 is shifted to the position wherein pressure cylinder 41 is impinged upon by pressure so as to actuate the upper press beam 9 in a downward direction. Thereby, the upper beam 9 is lowered. Throttle check valves 47 regulate the lifting speed in both directions. By way of carrier 10 and arm 3, the upper press beam 9 carries along upper press roll 2 in a downward direction. During the pressing of the front disc package edge, the upper press roll 2 reaches a preliminary terminal position in which the distance between the surfaces of the two press rolls 1 and 2 is larger by some millimeters than the thickness of disc package 14 (FIG. 2) which is pressed in the front or leading edge area by beam press 8, 9.

In order to assure on the one hand, even at great disc widths, a pressing as uniformly strong as possible, but on the other hand to obtain, even at small disc dimensions, no excessive surface pressures which may cause a break in the disc package, a progressive adaptation of the press pressure to the width of the disc package to be pressed takes place. For this purpose, a number of scanners or switches 15 are arranged in the entrance area of the working surface of the lower press beam 8, as shown in FIG. 8. They are distributed at suitable distances over the working width, starting from a disc abutting edge 16.

Figure 11:
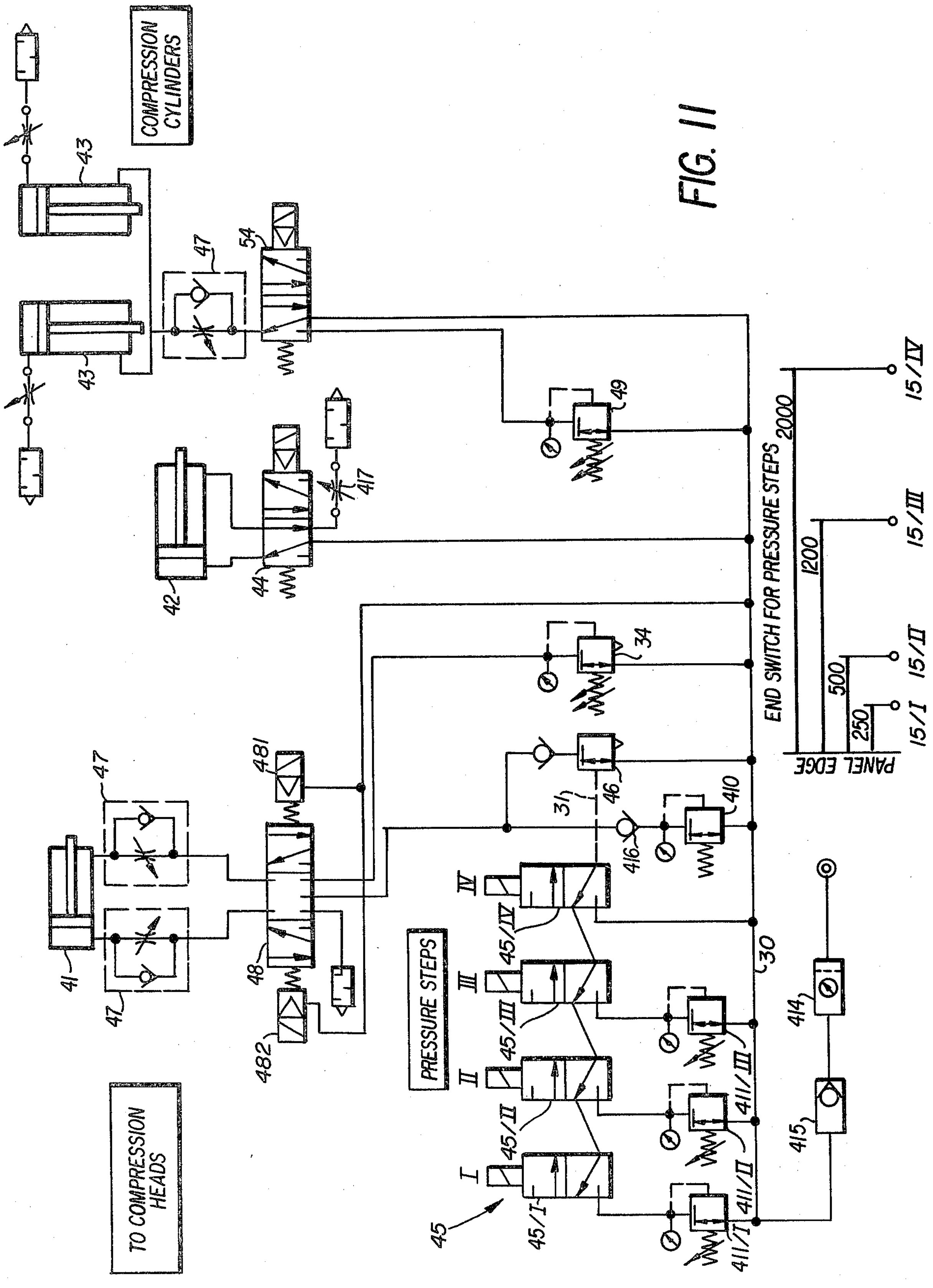
FIG. 11 is an exemplary diagrammatic representation of the pneumatic controls of the press.
Figure 12:
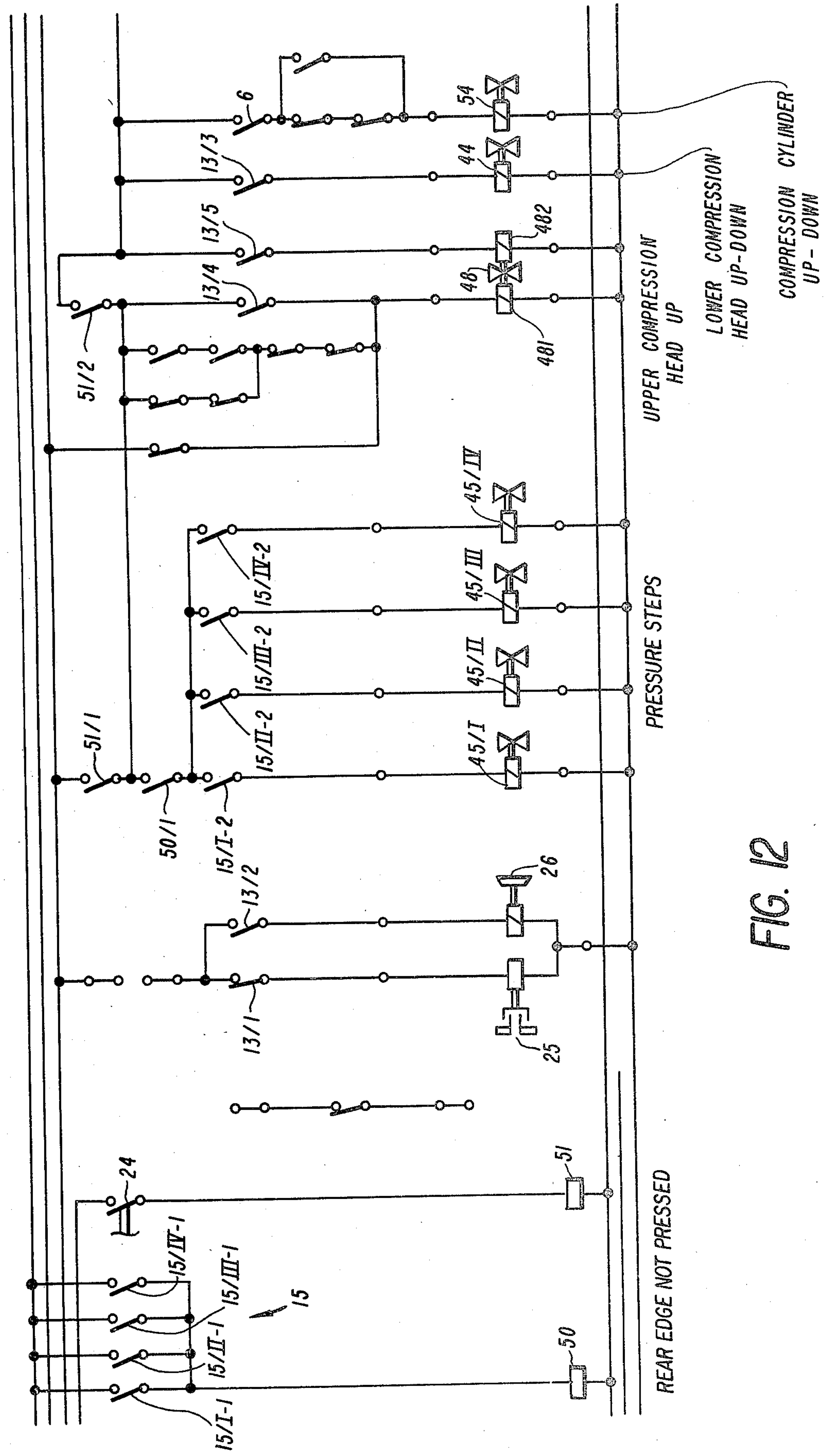
FIG. 12 is an exemplary diagrammatic representation of the circuitry of the invention.

In FIG. 11, these switches 15 are marked 15/1 to 15/IV in their different spacing from the disc abutting edge. Each of these switches 15 has two contact sets 1 and 2 (FIG. 12). Contact sets 15/I-1 to 15/IV-1 are parallel to each other and connected in series with a relay switch 50 which switches via its contact set 50/1 the current supply for four magnetic valves 41/I to 45/IV. In the current supply line leading to these magnetic valves, the respective second contact sets 15/I-2 to 15/IV-2 of switches 15/I to 15/IV are provided. As shown in FIG. 11, magnetic valves 45/I to 45/IV are connected in the initial position shown so that the pressure can be transmitted from one to the other. While magnetic valve 45/IV is directly connected to the common pressure line 30, magnetic valves 45/I to 45/III are connected via precision pressure regulators 411/I, 411/II, or 411/III. These precision pressure regulators are preset to prespecified values which are proportional to the pressure gradations and which are set by switches 15/I to 15/IV. The outlet of magnetic valve 45/IV is connected via a control line 31 with a pressure regulator 46 which is provided in the pressure supply line leading to the aforementioned pilot valve 48.

The tuning of the press pressure of beam press 8,9 to the edge width of disc package 14 to be pressed takes place in connection with the pneumatic mechanism described above in the following manner: Main switch 24 must be actuated and thus relay switch 51 must be energized so that its switch contacts 51/1 and 51/2 are closed. According to what has been described above, contact sets 13/3 and 13/4 are closed, while 13/5 is open, i.e., the lower press beam 8 is lifted and two way pilot valve 48 is opened so as to lower the upper press beam 9. The pressure reducer 34 produces a pneumatic counterweight to press beam 9. One or more switches 15/I to 15/IV, depending on the width of the disc package 14 (FIG. 8) which is conveyed into the work area of beam press 8,9, are covered and thus actuated. It will be assumed that the disc package 14 has a width between 500 and 1200, so that switches 15/I and 15/II are in the state of operation. Thus, contact sets 15/I-1 and 15/I-2 as well as contact sets 15/II-1 and 15/II-2 are closed. Relay switch 50 is connected to a separate circuit via parallel contacts 15/I-1 and 15/II-1, and is therefore energized, and the switch contact 50/1 of this relay switch 50 connects the switch contacts 15/I-2 to 15/IV-2 to voltage, of which contact sets 15/I-2 and 15/II-2, as described above, are closed. The magnetic valves 45/I and 45/2 thus connected to voltage switch the circuit from the through position to its respective precision pressure regulator 411/I or 411/2, respectively. Magnetic valve 45/I becomes ineffective, via the response of magnetic valve 45/II, while precision pressure regulator 411/II is connected to magentic valves 45/III and 45/IV, which are still in the through passage state, via magnetic valve 45/II. Thus, the pressure set in precision pressure regulator 45/II, which is proportional to the disc package width between 500 and 1200, is connected via control line 31 to pressure regulator 46. Dependent on this control pressure, which varies from on pressure stage to the other, pressure regulator 46 opens more or less, so that in connection with a pressure reducer 410 as pneumatic counterweight, in each case only the pressure that is specific for the disc package width reaches the left chamber of pressure cylinder 41. This automatic gradation of the press pressure to the disc package width assures a constant pressing. This is also advantageous, for example, when a disc package presents a geometrical shape deviating from a rectangle, i.e., when the lengths of the front and rear transverse edges are different. In disc types which, for example, extend toward one end with a pointed or trapezoidal shape, the scanning principle described above is of special importance. When the rear edge length of such a disc package is, for example, below 250, none of the switches 15/I to 15/IV is actuated so that automatically a pressing is prevented. In the event the transverse edge is very short or non-existent, the necessary pressing is carried out, in the course of the following passage, by the pair of rolls 1 and 2.

After the pressing of the front transverse edge of disc package 14 according to FIG. 2, contact sets 13/1 and 13/5 are closed, and 13/2, 13/3 and 13/4 are open. The switching operation of contacts 13/1 and 13/2 acts in a delayed manner so that meanwhile pilot valve 44 can return to the initial position shown in FIG. 11, wherein the pressure free cylinder 42, damped by the net weight of the lower press beam by way of a throttle valve 417, returns to the lowered position. Simultaneously, by the shifting of two way pilot valve 48, the result is accomplished via the then energized servo valve 482 that the upper press beam 9 is lefted from the disc package 14 by some millimeters, as shown in FIG. 3. The upper press roll 2 remains in the position one assumed. With the opening of the press beam 8,9 the delayed effect of contact sets 13/1 and 13/2 takes place, so that brake 26 is released and clutch 25 is engaged again. Thereby, the rolls of conveyer belt 11 and 4 are synchronously driven, whereby disc package 14 is fed to the pair of rolls 1, 2. In the course of this advance, disc package 14 actuates switch 6 which in turn actuates a pilot valve 54. In this position, pressure cylinder 43, which acts upon the upper press roll 2, is connected via a pressure reducer 49 with a pressure line 30. By this pressure reducer a prespecified weight portion of the upper press roll 2 is compensated by a pneumatic counterweight, so that it rests with a defined part of its net weight on disc package 14. The sequences are chosen in such a way that press roll 2 comes to rest upon the edge area previously pressed by beam press 8,9 and presses the longitudinal edges of disc package 14, in the passage of the disc package between the rolls 1 and 2.

When a pressing of one or a sequence of disc packages cannot take place, main switch 24 must be opened. The relay switch 51 thus becomes currentless and interrupts via its switch contacts 51/1 and 51/2 the circuits leading to the beam press control and press roll control.

When standard measurement assemblies are to be processed, it is within the scope of the invention to provide a second pair of compression heads, or a plurality of such pairs, spaced from each other distances such as required for spaced transverse sealings of the assemblies, such as the distance between their leading and trailing edges, and to operate the heads for compression of the leading and trailing edges in situ simultaneously.

As shown on FIGS. 7*a* to 7*f*, an additional improvement the invention permits a continuous operation free of interruptions. However, it requires a specific minimum length of the disk package 14 which is to be pressed.

The mechanical structure corresponds essentially to that described in connection with FIG. 1. As a basic difference, however, the beam press with the associated conveyor track 11 is displaceable in longitudinal direction relative to the pair of cylinders with the associated conveyor track 4. The length of the path of displacement "S" of the beam press results from the speed of advance, taken as a base, of the disk package which is to be pressed, and the duration of the edge pressing. Therefore a means 3b to move the beam press is provided.

With the entrance of a disk package into the area of the beam press, the front track switch 13 is actuated. By way of this switch 13 the beam press is set in motion in the direction toward the cylinders. It has reached the speed of advance of the disk package when the front transverse edge thereof is positioned approximately in the middle underneath the beam press 8,9 as shown on FIG. 7*a*. At this moment, the beam press closes. In the course of the further advance, the front transverse edge of the disk package is compressed. The operation is finished when the beam press which moves along has covered the distance of the displacement "S" as shown on FIG. 7*b*. For instance by striking, the beam press opens and returns with an increased speed to the initial position as shown on FIG. 7*c*. The conveyor track 11 of the previous embodiment of the beam press can be driven in this process in such a way that it even supports the advance of the disk package. The disc package thus moves with a continuous advance to between the pair of cylinders. In the initial position the beam press awaits the entrance of the trailing transverse edge of the disk package, which in turn is signaled by the switch 13 as shown on FIG. 7*d*. As described with relation to FIG. 7*b*, the beam press is set in motion with the speed of the disk package and closes simultaneously. During the longitudinal displacement over the distance "S" the trailing transverse edge of the disk package is also compressed during the longitudinal displacement. When the terminal position is reached, the beam press opens again as shown on FIG. 7*e* and returns subsequently to the initial position shown on FIG. 7*f*, wherefrom in case of need a new cycle of operations starts without interruption. The method of the invention is shown in a simplified block diagram on FIG. 10. The longitudinal speed of the cylinders 41, 42 and 43 may be controlled for instance, by chokes installed directly in the cylinders. Means for a fine control of the compression is further provided by the pressure reducer 34 which exerts sufficient counter pressure to provide a soft, gentle contact with the panel.

The embodiments described above of the continuous press are suitable for horizontal as well as vertical operation. The latter presents the advantage that it can be combined without difficulties with other vertically operating machines of a manufacturing plant. Besides, the vertical version requires smaller floor space and permits an easier processing of the disk packages with large surfaces since glass disks placed upon the spacers have a tendency to bend at horizontal processing.

Instead of the conveyor rolls other conveyor means such as an endless belt may be employed.

While the lower cylinder has been described as mounted stationary, it is within the scope of the invention to reverse or alter the arrangement in such a manner that at least one of the cylinders is moved relative to the other to an assembly package compressing distance and the means to actuate the vertical reciprocation of the upper cylinder in such an instance is means to actuate the vertical reciprocation of either or both of the cylinders.

It is within the scope of this invention to reverse the sealing sequence which starts with the transverse compression by the heads followed by the longitudinal compression by the cylinders.

What is claimed is:

1. A continuous press for compression of assemblies of multiple flat panels such as of insulating glass with interposed shaped frames provided on both sides with sealing material comprising:

a pair of compression cylinders spaced from each other in parallel alignment;

a beam press having a pair of compression heads spaced from each other in parallel alignment;

a conveyor means for conveying said assemblies in a path of travel in the direction from said beam press toward said cylinders;

said cylinders and said compression heads extending transversely to the direction of said path;

means to reciprocate at least one of said cylinders toward said other cylinder, leaving a spacing between them equal to the thickness of said panel assembly when compressed;

means to reciprocate at least one of said compression heads toward said other compression head, leaving a spacing between them equal to the thickness of said panel assembly when compressed;

sensing means to sense assemblies conveyed over said path through the spacing between said compression heads and operative to actuate the reciprocation of the compression heads into a compression sealing engagement of a portion of said assemblies; and means to cause the reciprocation of at least one of said cylinders in response to the reciprocation of at least one of said compression heads to actuate the sealing compression of said cylinders against a portion of said assemblies.

2. A continuous press for compression of assemblies as claimed in claim 1, said beam press further including means to reciprocate it in the longitudinal direction of the path of travel of the said panel assemblies toward and from the said pair of cylinders.

3. A continuous press for compression of assemblies as claimed in claim 1, said conveyor means comprising:

means to convey said assemblies in a path between said pair of heads for transverse compression of the leading and trailing edges thereof, followed by travel between said pair of cylinders for longitudinal compression of the side edges thereof.

4. A continuous press for compression of assemblies as claimed in claim 1, said means to reciprocate said at least one head and said at least one cylinder comprising means to reciprocate vertically said heads and said cylinders in timed synchronized relation to each other.

5. A continuous press for compression of assemblies as claimed in claim 1, said pair of cylinders and said pair of compression heads being in horizontal alignment, with the upper cylinder superimposed over the lower cylinder and the upper compression head superimposed over the lower compression head, the said path of travel of said assemblies being horizontal between said heads and said cylinders, respectively, in succession of their travel, said conveyor means comprising:

a front conveyor track associated with the beam press;

means to control the drive of said beam press separately from the front conveyor track;

said means to reciprocate at least one of said cylinders relative to the reciprocation of at least one of said heads being means to reciprocate vertically the upper cylinder in response to the vertical reciprocation of said upper head.

6. A continuous press for compression of assemblies as claimed in claim 5, said lower cylinder being mounted stationary with a horizontal plane drawn tangential to it being in alignment with the plane of said path of travel.

7. A continuous press for compression of assemblies as claimed in claim 5, the lower head being vertically reciprocable toward and away from the level of said path of travel.

8. A continuous press for compression of assemblies as claimed in claim 6, further comprising at least one means to scan the width of said assemblies and means to control the transverse and longitudinal compressions of the assemblies in response to the outside of said means to scan.

9. A continuous press for compression of assemblies as claimed in claim 8, further comprising:

a source of pressure;

a plurality of valves in conduit connection with said source of pressure;

said valves delivering magnitudes of pressure different from each other in scaled steps to said heads and cylinders;

said means to scan comprising a plurality of a scanners spaced for each other over the operating width of said path, said scanners each controlling a respective one of said plurality of valves for pressure distributions of different magnitudes.

10. A continuous press for compression of assemblies of multiple flat panels such as of insulating glass with interposed shaped frames provided on both sides with sealing material, conveyed in a continuous horizontal path such as on an endless belt from a loading station to a delivery station, comprising:

a beam press having a pair of compression heads, being an upper head and a lower head, said heads spaced from each other in parallel vertical alignment;

a pair of compression cylinders spaced from each other in vertical parallel alignment and spaced from said beam press in a horizontal alignment;

a conveyor means of said assemblies including a loading and a delivery station and defining with the plane of its surface a horizontal plane of path of travel of said panel assemblies for sealing them in the direction from said beam press toward said cylinders;

the said cylinders and said compression heads extending transversely to the direction of said path;

a plurality of valves, each delivering a pressure of a different magnitude for reciprocation of the said heads and cylinders;

a plurality of scanners spaced from each other over the operating width of said path to scan in succession the width of said assemblies, each scanner controlling its own valve for the correct magnitude of pressure distribution; p1 means actuated by said valves to reciprocate the upper and the lower compression heads automatically, controllably and sequentially toward and from each other, leaving a space between them equal to the thickness of said assemblies when compressed, to seal them transversely and to release them;

each of said means to reciprocate exerting a pressure of a different magnitude in response to the output of its associated scanning means;

means to reciprocate the upper of said pair of cylinders automatically and sequentially toward and from the upper surfaces of said assemblies when compressed, to seal their side edges longitudinally, the lower of said pair of cylinders remaining stationary with its surface touching the said horizontal path; and means to synchronize the steps of loading, conveying, scanning, compression seaing and unloading said assemblies in timed uninterrupted succession.

11. A continuous press for compression of assemblies as claimed in claim 10, further comprising:

timing means to move said compression heads from their spaced initial position from the said cylinders toward the cylinders at the speed of advance of the assembly less the time required for the transverse compression of each respective leading and trailing edge and subsequently to return the compression heads to their said spaced initial position.

* * * * *